United States Patent [19]

Honjo et al.

[11] 4,451,860

[45] May 29, 1984

[54] TRACKING-ERROR CORRECTING SYSTEM IN A VIDEO REPRODUCING APPARATUS

[75] Inventors: Masahiro Honjo; Masao Tomita, both of Neyagawa, Japan

[73] Assignee: Matsushita Electric Industrial Co., Ltd., Osaka, Japan

[21] Appl. No.: 309,497

[22] Filed: Oct. 6, 1981

[30] Foreign Application Priority Data

Oct. 9, 1980 [JP] Japan ............................. 55-141209
Jan. 16, 1981 [JP] Japan ............................... 56-5273
Jun. 12, 1981 [JP] Japan .............................. 56-91181

[51] Int. Cl.³ ............................................. G11B 5/58
[52] U.S. Cl. ..................................................... 360/77
[58] Field of Search ..................... 360/10.2, 77, 76, 75

[56] References Cited

U.S. PATENT DOCUMENTS 4,148,083 4/1979 Watanabe ............................. 360/77
4,167,763 9/1979 Kubota ................................. 360/77
4,197,565 4/1980 Watanabe ............................. 360/77

FOREIGN PATENT DOCUMENTS 2068599 8/1981 United Kingdom ................. 360/77

*Primary Examiner*—George G. Stellar
*Attorney, Agent, or Firm*—Wenderoth, Lind & Ponack

[57] ABSTRACT

A tracking-error correcting system in a rotary head magnetic recording and reproducing apparatus in which the reproducing magnetic heads can move in the direction of their axis of rotation by using a bi-morph leaf having piezoelectric elements. This system can automatically detect the tracking-error between the reproducing head and a recorded track, and move the reproducing head in a direction to attain better tracking position while the head is not in contact with the magnetic tape, so that either head's scanning trace is always parallel to the recorded track. The system is protected from jitter or color flicker on the monitor television screen when the heads move in the direction of their axis of rotation.

8 Claims, 15 Drawing Figures

TRACKING-ERROR CORRECTING SYSTEM IN A VIDEO REPRODUCING APPARATUS

BACKGROUND OF THE INVENTION

In a rotary head magnetic recording and reproducing apparatus it is necessary to detect tracking error between a reproducing head and a recorded track and to move the reproducing head in the direction of its axis of rotation so that the reproducing head is placed at a better tracking position. Such a system is called an 'auto-tracking system'.

In all conventional systems, the reproducing head is moved while the head is contacting the magnetic tape, so that 'jitter' or 'color flicker' of the monitor television screen are unavoidable because of the influence of the head movement.

Here, we described two conventional examples.

The first system vibrates the reproducing head in the direction of its axis of rotation at a standard frequency, and detects the envelope of the reproduced high frequency video signal (hereinafter refered to as RF signal). This first system then compares the phase difference between said envelope and said standard frequency, whereby it detects the tracking error between the head and recorded track, and moves the head in the direction that attains better tracking. But in the first system, the reproducing head is always vibrated as shown in FIG. 1(a). A reproducing head A crosses the recorded track B at an angle (the maximum angle is $\theta_1$). Accordingly, the influence of the movement of the head causes jitter or color flicker to appear on the screen of the monitor television. In addition, the influence sometimes causes the resonance of the piezo electric element, which has a bad influence on the screen of the monitor television.

The second system detects the envelope of the RF signal and determines its amplitude by a sample-and-hold circuit, and then compares the amplitude of the envelope with the amplitude of the previously sampled envelope at several points in a field, so as to move the reproducing head in the direction to attain better tracking while the reproducing head is contacting the magnetic tape. But, in this second system, as shown in FIG. 1(b), the reproducing head A crosses the recorded track B at an angle ($\theta_2$). Accordingly, the movement of the head causes jitter of color flicker of the picture on the monitor television screen.

SUMMARY OF THE INVENTION

In view of the foregoing two examples, when an RF signal from the VTR is not reproduced or the RF signal level is very low, said two conventional systems unavoidably mistake the action of the tracking system.

An object of this invention is to solve the above mentioned problems. This invention moves the head to attain better tracking position, without causing jitter or color flicker on the TV screen, by moving the head while the head is not in contact with the tape.

BRIEF DESCRIPTION OF THE DRAWINGS

Hereinafter, we will describe in detail how to control the movement of reproducing heads with the aid of the accompanying drawing of which.

Now, the reproducing speed of the magnetic tape is the same as the recording speed.

DESCRIPTION OF THE PREFERRED EMBODIMENT

Figure 1:
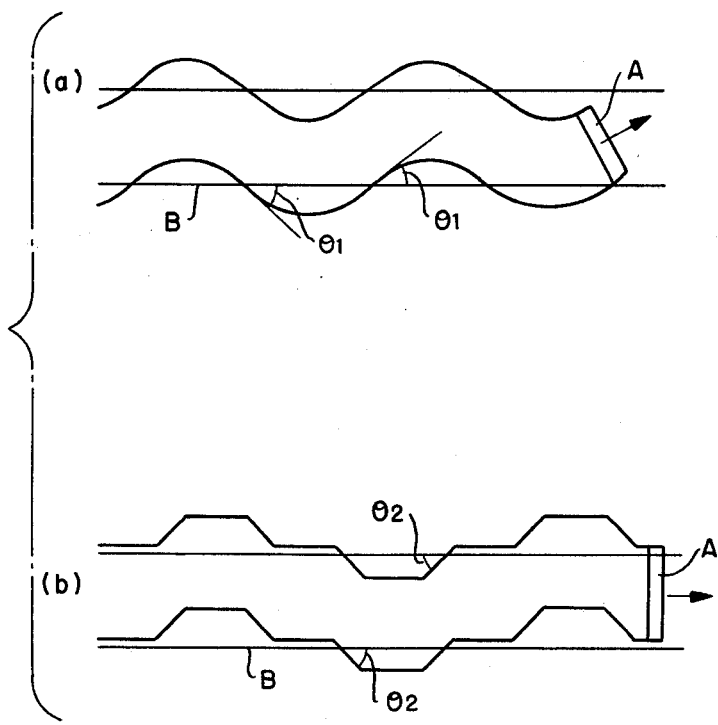
FIG. 1 shows a scanning trace of the reproducing head and a recorded track in the old tracking error system.
Figure 2:
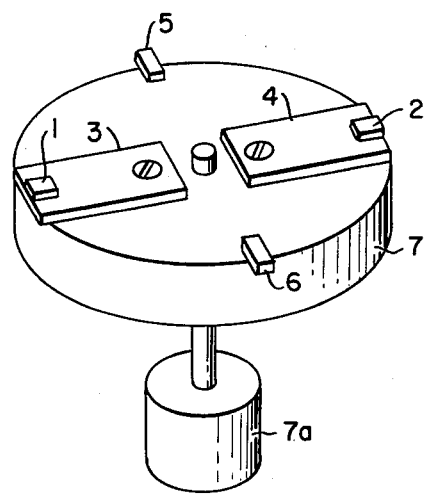
FIG. 2 shows a schematic of a VTR using a piezo electric section.

FIG. 2 shows a schematic view of a VTR using a piezoelectric element. In FIG. 2, elements 1 and 2 are reproducing heads; elements 3 and 4 are bi-morph leaves each having a piezo-electric element; elements 5 and 6 are recording and reproducing heads element 7 is a rotary cylinder; element 7a is a motor. The bi-morph leaves 3 and 4 are controlled in their movement by a control voltage.

Figure 3:
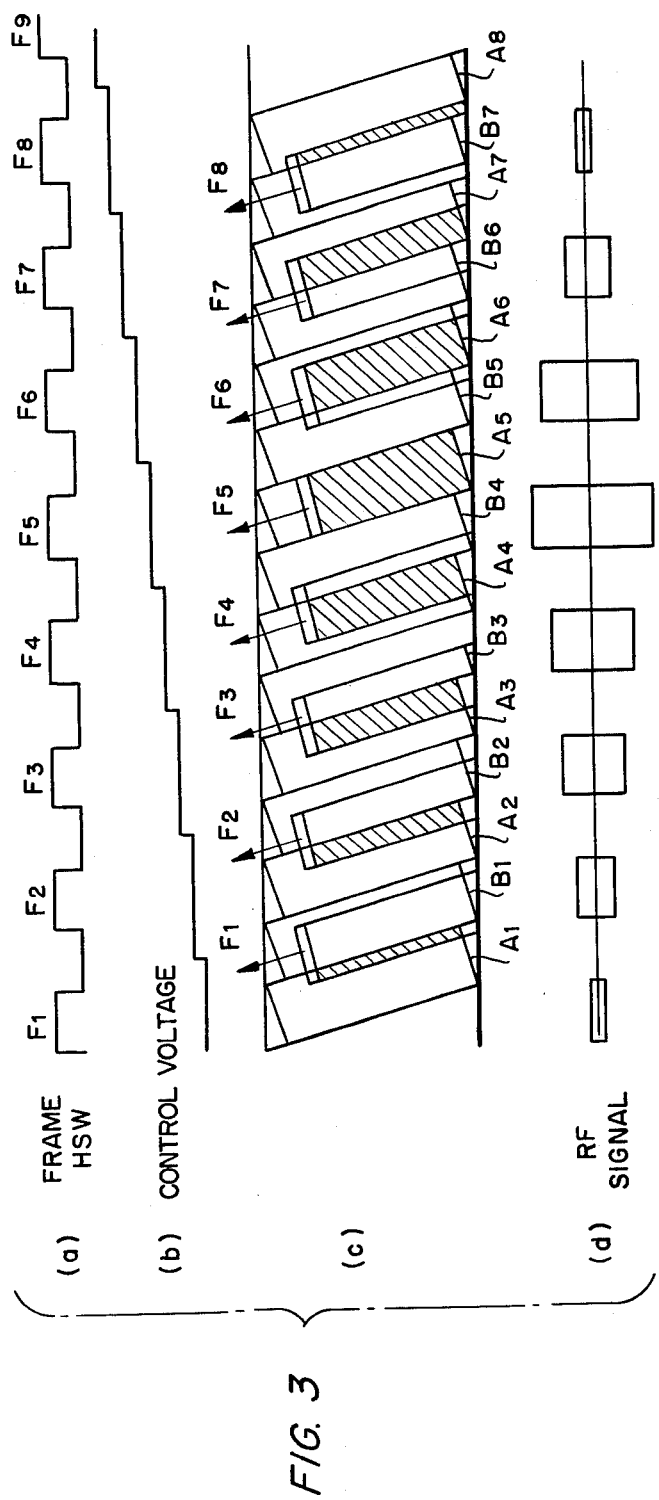
FIGS. 3(a)-(d) show the relationship between a control voltage and an RF signal.

FIG. 3(a) shows a head switch signal (HSW); when the HSW is at a high level, reproducing head 1 is touching the magnetic tape and reproduces signals from the recorded track. In FIG. 3(c), $A_1$, $A_2$, $A_3$, ... are tracks recorded by a recording head with an azimuth A, and $B_1$, $B_2$, $B_3$, ... are tracks recorded by a recording head with an azimuth B. Reproducing head 1 with an azimuth A can reproduce signals from the tracks $A_1$, $A_2$, ... but can't reproduce signals from the tracks $B_1$, $B_2$ ... When the control voltage which increases step by step in each frame is supplied to the piezo-electric element as shown in FIG. 3(b), the scanning trace of the reproducing head changes as shown in FIG. 3(c), so that RF signal level changes as shown in FIG. 3(d). In FIG. 3(c), an oblique part shows a reproductive part which has the same azimuth A as reproducing head 1, and $F_1$, $F_2$ ... are first frame, second frame ..., etc. Next, we will describe how to control the voltage to the piezo electric element so that RF signal level is kept at a maximum level. This system of the invention samples and holds the envelope of the RF signal from the VTR, and changes (e.g. increases) the control voltage to the piezoelectric element, and then compares the envelope amplitude in the next frame with the held envelope amplitude in the previous frame. As a result, if the next envelope, amplitude is higher than the previous envelope amplitude, the control voltage, will be further increased, and continue comparing the envelope amplitude with subsequent frame's envelopes. In other words, the control voltage will be changed in the same direction until the envelope level becomes lower than the previous envelope level. When the envelope level is lower than the held envelope level of the previous frame, the direction of the control voltage will be inverted.

Figure 4:
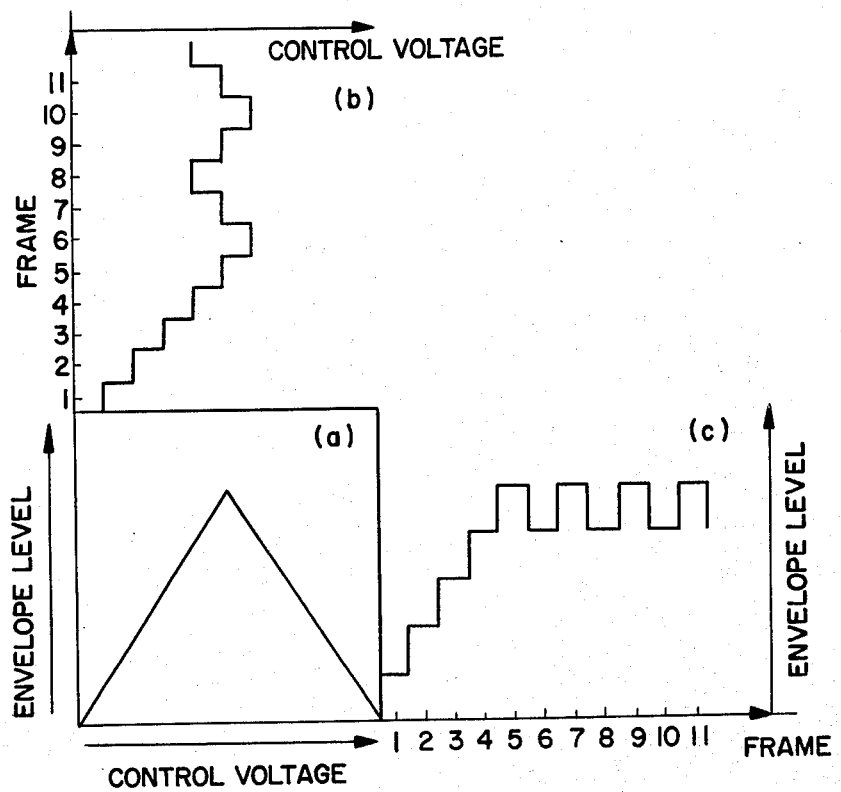
FIG. 4 shows a schematic of the relationship between the control voltage and an envelope level.

FIG. 4 shows a schematic diagram of a relationship between the control voltage and the envelope amplitude. FIG. 4($b$) shows the change of the control voltage in each field and FIG. 4($c$) shows the change of the reproduced envelope amplitude. As shown in FIG. 4, until the 5th frame the envelope amplitude or level increases in the same direction and the control voltage also increases. However, at the 6th frame, the envelope level begins to decrease, that is, the direction of the control voltage is inverted so as to be decreasing. Also, the envelope level at the 7th frame increases again. The envelope level of 8th frame decreases. As noted above, the direction of the control voltage is then again inverted in turn.

In this way, the system of this invention controls the control voltage so as to keep a balance in the neighborhood of any point to obtain the maximum envelope level. And the system of this invention moves the position of the reproducing head while the head is not contacting the magnetic tape. Accordingly, the reproducing head scans the recording track keeping parallel to it. This means no jitter or color flicker on the TV screen.

Figure 5:
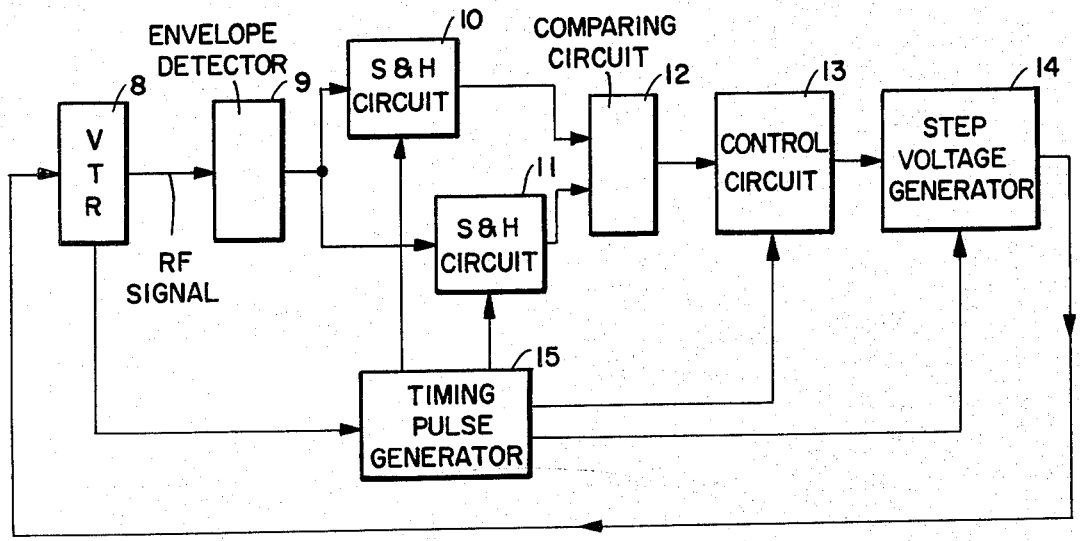
FIG. 5 shows a schematic block diagram of this invention.

FIG. 5 shows a schematic block diagram of this invention (only one head is considered for simplicity). An envelope detector 9 detects the envelope of an RF signal from VTR 8, and supplies the output signal to two S/H circuits 10 and 11 (two S/H circuits are required for one reproducing head). The S/H circuits sample and hold the input signal in turn according to sampling pulses from a timing pulse generator 15. Outputs of the S/H circuits are supplied to a comparing circuit 12, and the output of comparing circuit 12 is supplied to a control circuit 13. Control circuit 13 controls a control step voltage generator 14 according to signals from the timing pulse generator 15 and the output from the comparing circuit 12. Control voltage generator 14 controls the movement of the reproducing head in the VTR 8.

Figure 6:
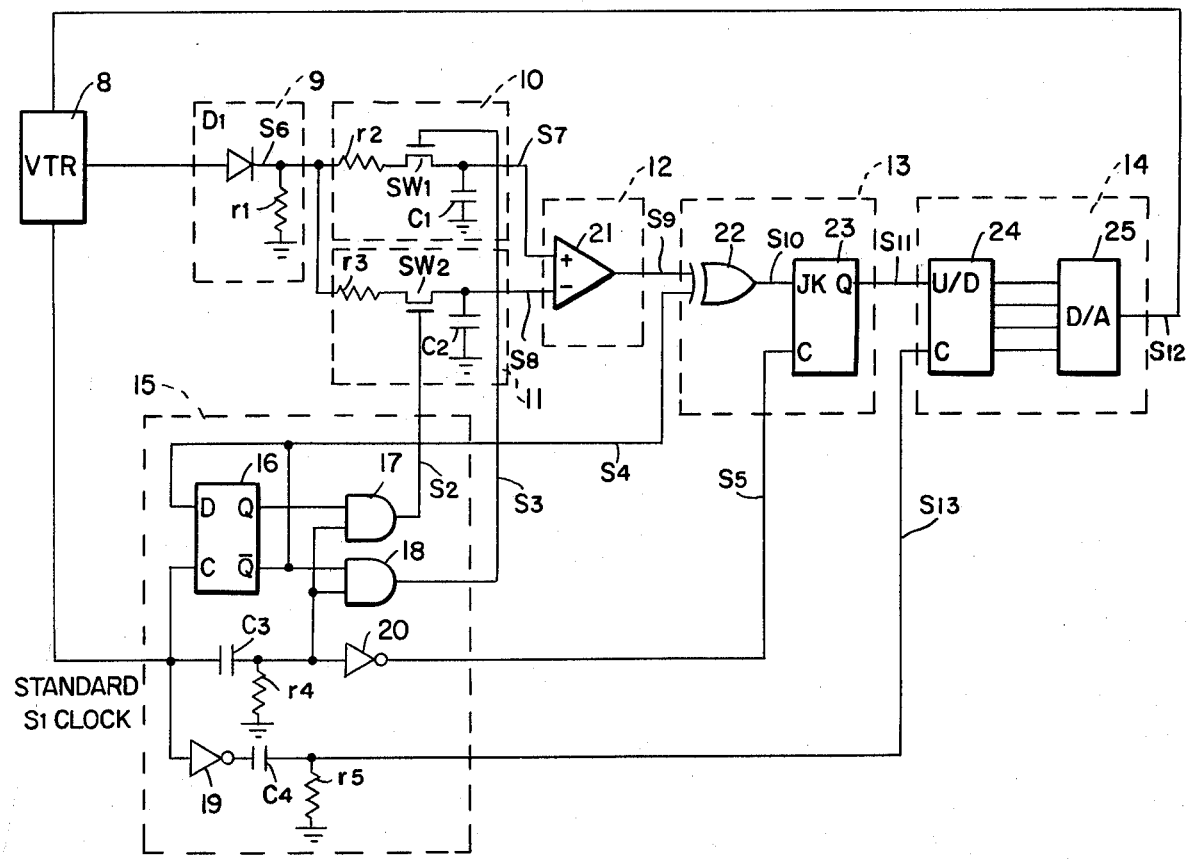
FIG. 6 shows a schematic circuit diagram of this invention.
Figure 7:
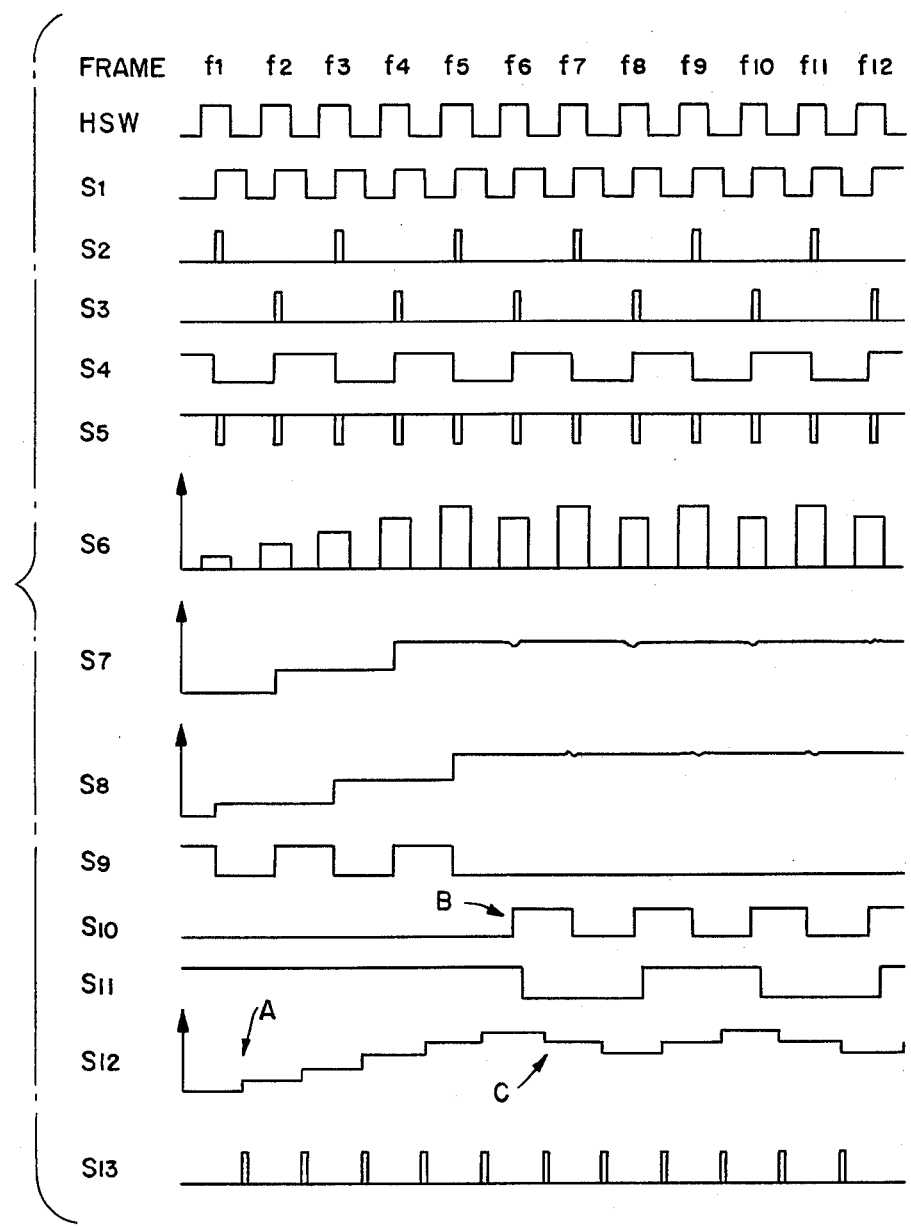
FIG. 7 shows a timing chart of this invention.

FIG. 6 shows a circuit diagram of this invention, and FIG. 7 shows a timing chart corresponding to FIG. 6. Envelope detector 9 comprises a diode $D_1$ and a resistor $r_1$, and detects the envelope of the RF signal. S/H circuits 10 and 11 comprise two switches $SW_1$ and $SW_2$, two resistors $r_2$ and $r_3$, and two capacitors $C_1$ and $C_2$, respectively. Resistors $r_2$ and $r_3$ are inserted to cancel high frequency noise, but are not essential components for this invention. Timing pulse generator 15 comprises a D-flip flop (D-FF) 16, AND gates 17 and 18, inverters 19 and 20, capacitors $C_3$ and $C_4$ and resistors $r_4$ and $r_5$. This generator generates timing clocks $S_2$, $S_3$, $S_4$, $S_5$, and $S_{13}$ from a standard clock $S_1$. Comparing circuit 12 comprises an Op-Amp 21. Control circuit 13 comprises an exclusive-OR gate 22 and a JK-flip flop (JK-FF) 23. Control voltage generator 14 comprises an up-down counter 24 and a D/A converter 25 (e.g., a ladder network comprising resistors).

Now, referring to FIG. 7, we discuss the second frame ($f_2$). After the control voltage increases at a point A, the system of this invention samples and holds the envelope level of the RF signal ($S_6$) by sampling pulses ($S_3$). The signal ($S_7$) increases till ($S_7$)>($S_8$), whereby the output ($S_9$) of the comparing circuit becomes high ("H") level. The output signal $S_{10}$ of the exclusive-OR gate 22 becomes low ("L") because its input signals $S_9$ and $S_4$ are both (high) "H". Thus, output ($S_{11}$) of JK-FF 23 remains unchanged (i.e. remains "H") on the clock $S_5$. Accordingly, the up-down counter 24 begins counting up again, so that the control voltage signal $S_{12}$ increases. This action continues repeatedly until the held level of the envelope becomes lower than the held level of the previous envelope.

Next, we discuss the sixth frame ($f_6$). Signal $S_8$ is held by $S_2$, and $S_7$ is held by $S_3$. At this time, the level of $S_7$ is lower than $S_8$, so that the output ($S_9$) of the comparing circuit 12 becomes "L", and another input ($S_4$) of the exclusive-OR 22 is "H", so that the output ($S_{10}$) of the gate 22 turns to "H" (at a point B). Thus, the output ($S_{11}$) of the JK-FF 23 turns to "L" at the positive going edge of clock $S_5$. Accordingly, the up-down counter 24 counts down on the positive going edge of clock $S_{13}$, so that the output of the control voltage generator 14 decreases (at a point C of $S_{12}$).

The standard clock $S_1$ is a signal whose phase is different from that of the HSW signal by about 90°. So, the sampling hold clocks $S_2$ and $S_3$ are generated at about the center of the reproducing field. This is a strong point of this invention because the level of the reproduced envelope at the center of a field is more stable than that at the edge of a field. Then, the signal $S_{13}$ are generated at about the center in the unreproducing field; this is another strong point of this invention because the system of the invention changes the state of the reproducing head when the head is not in contact with the magnetic tape.

In this way, this invention keeps the maximum envelope level by controlling the control voltage $S_{12}$.

By now, we have described the tracking-error correction of this invention during normal reproduction in which the reproducing tape speed is the same as the recording tape speed.

Hereinafter, we will describe the tracking-error correction during abnormal reproduction in which the reproducing tape seed is different from the recording tape speed (i.e., still motion, slow motion, and fast motion).

Figure 8:
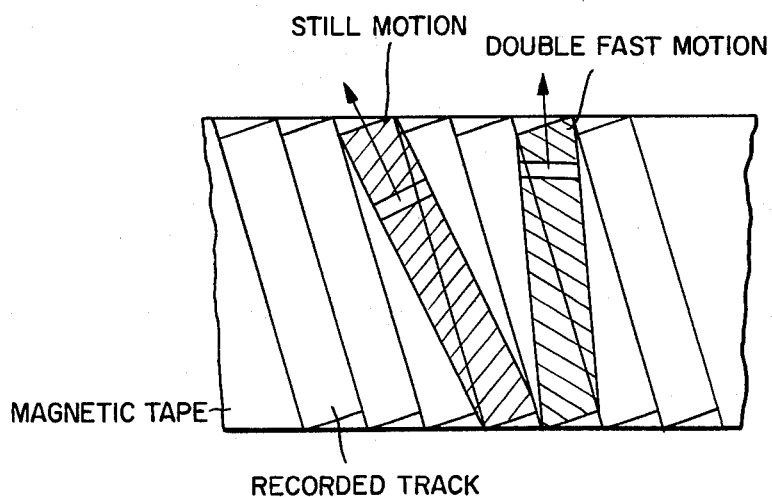
FIG. 8 shows a recording pattern on the tape and a scanning trace of a head in the still motion mode and the double fast motion mode.
Figure 9:
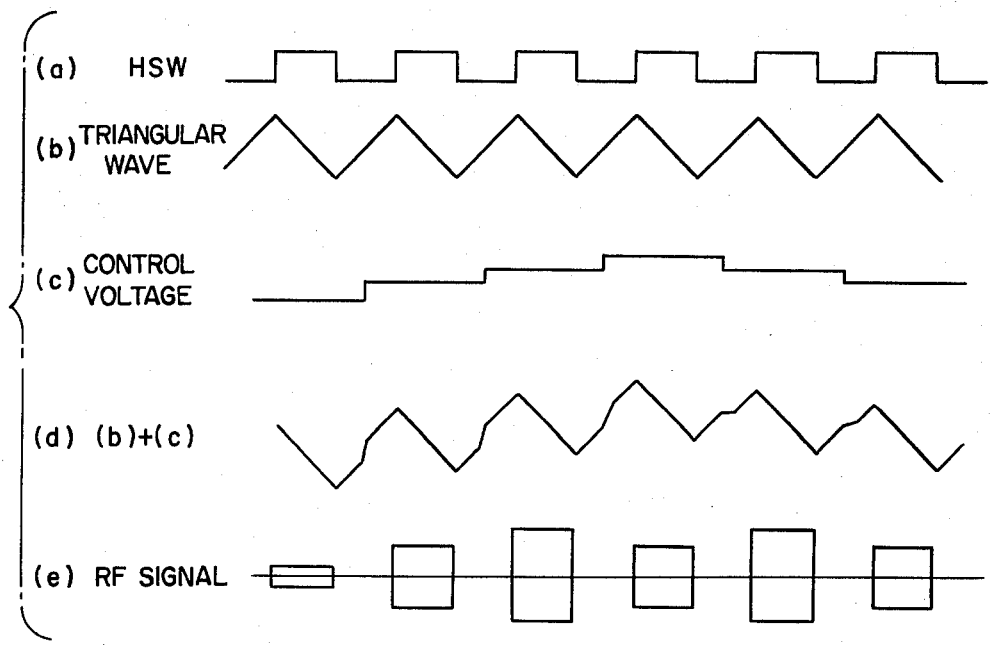
FIGS. 9(a)-(e) show a triangular wave for abnormal reproduction, and a control voltage from this invention, and a mixed signal and RF signal.

FIG. 8 shows the recorded pattern on the tape and the head scanning trace in still motion and double fast motion modes. In FIG. 8, the head scanning trace during abnormal reproduction is different from the recorded track, so that it is necessary to use this invention to adjust the slant of the head scanning trace. Here, it is possible to adjust the slant by applying a triangular wave or a sawtooth wave to the moving head. FIGS. 9($a$)-($e$) show the still motion mode; FIG. 9($a$) shows HSW; FIG. 9($b$) shows a triangular wave for abnormal reproduction; FIG. 9($c$) shows the control voltage signal according to this invention; FIG. 9($d$) shows the mixed signal fed to a moving head; FIG. 9($e$) shows a example of an RF signal from the VTR.

Figure 10:
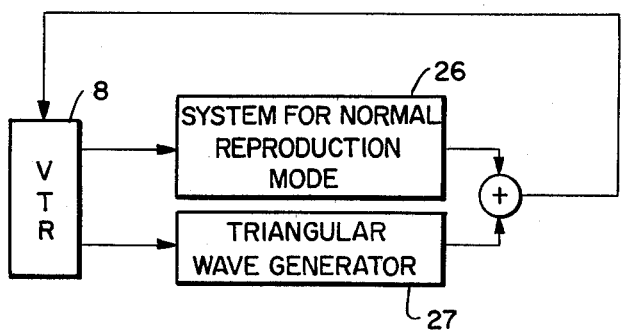
FIG. 10 shows a schematic block diagram of a system used during abnormal reproduction.

FIG. 10 shows a schematic block diagram of the system used during abnormal reproduction. As shown in FIG. 10, a triangular wave generator 27 corrects the difference of slant between the trace of the reproducing head and the recorded track. Then, the signal from the triangular wave generator 27 and the signal from the tracking error correcting system for normal reproduction mode are mixed, and the mixed signal is supplied to the moving head in VTR 8. By this comfiguration, this system can correct the tracking error and keep the scanning trace of the reproducing head parallel to the recorded track.

Figure 11:
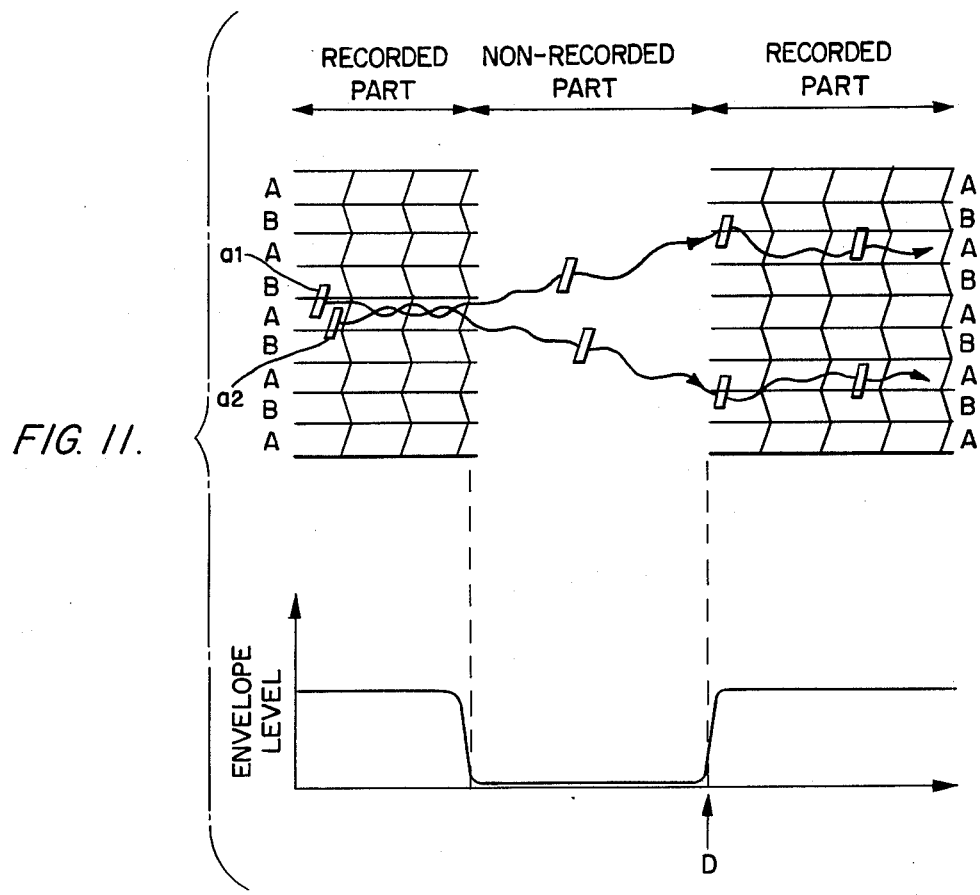
FIG. 11 shows a recorded and non-recorded part of the magnetic tape.
Figure 12:
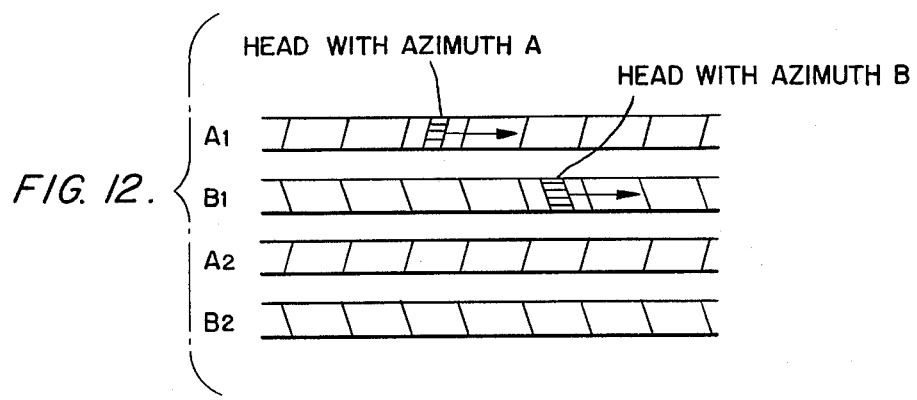
FIG. 12 shows an example of the relationship between the recorded track and the reproducing head.

As mentioned above, we detailed the case wherein the RF signal is reproduced. But if the RF signal is not reproduced or is reproduced as a very low level signal, conventional auto-tracking systems unavoidably mistook the action of the tracking system. For an example of a low RF level, there is the case in which the reproducing head scans part of the magnetic tape on which nothing was recorded, as shown in FIG. 11. FIG. 11 shows a recording part and non-recorded part on the magnetic tape, and the envelope level. Recorded track A has A azimuth, and recorded track B has B azimuth, and the reproducing heads $a_1$, $a_2$ have A azimuth. When the head reproduces the signal again (point D in FIG. 11) two reproducing heads sometimes reproduce another track as shown in FIG. 11, in this case, the reproduced picture becomes extremely unsightly. As another example, there is the case in which the reproducing head's width is smaller than the distance moved by the magnetic tape in a frame. FIG. 12 shows the recorded tracks $A_1$, $A_2$, ... which were recorded by a recording head with azimuth A, and the recorded tracks $B_1$, $B_2$, ... which were recorded by a recording head with azimuth B. The slant of the head gap with azimuth A is different from the slant of the head gap with azimuth B. So, the head with azimuth A can reproduce the recorded tracks with azimuth A, but can't reproduce the recorded tracks with azimuth B.

Figure 13:
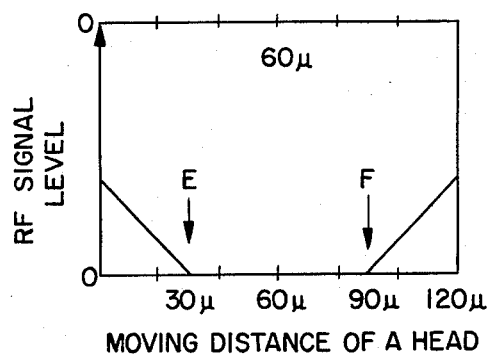
FIG. 13 shows the relationship of the RF signal level and the distance moved of a head.

FIG. 13 shows (for example) that the head width is $30\mu$, and the distance moved by the magnetic tape in one frame is $120\mu$. When the head with azimuth A moves $120\mu$ in the direction of the track width, the reproducing envelope changes as shown in FIG. 13. That is to say, while the head moves from $30\mu$ (point E) to $90\mu$ (point F), the head can't reproduce. If the reproducing head is in this position, the head can't reproduce anything, so that it is impossible to correct the tracking error by using conventional tracking systems. This invention solves the above problems.

Figure 14:
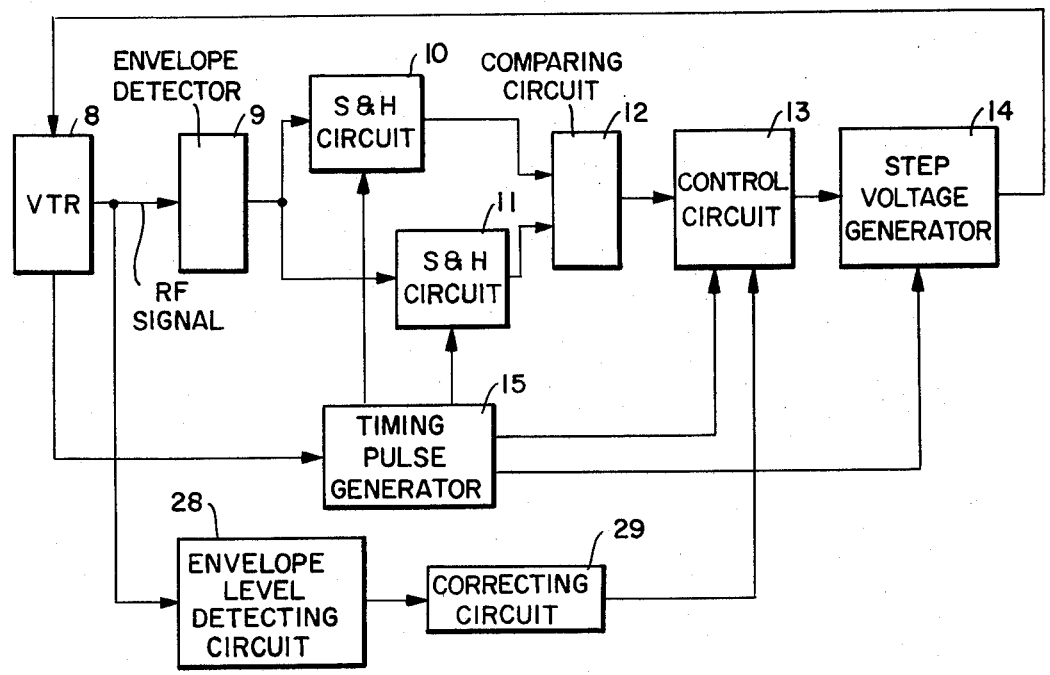
FIG. 14 shows a schematic block diagram of this invention.

FIG. 14 shows a schematic block diagram of this invention. The block numbers 8-15 are the same as shown in FIG. 5; element 28 is an envelope level detector and element 29 is a correcting circuit. When the envelope level from a VTR is lower than a predetermined threshold, the envelope level detector 28 supplies a signal to the correction circuit 29. The correction circuit 29 controls the movement of the reproducing head as shown in FIG. 15.

Figure 15:
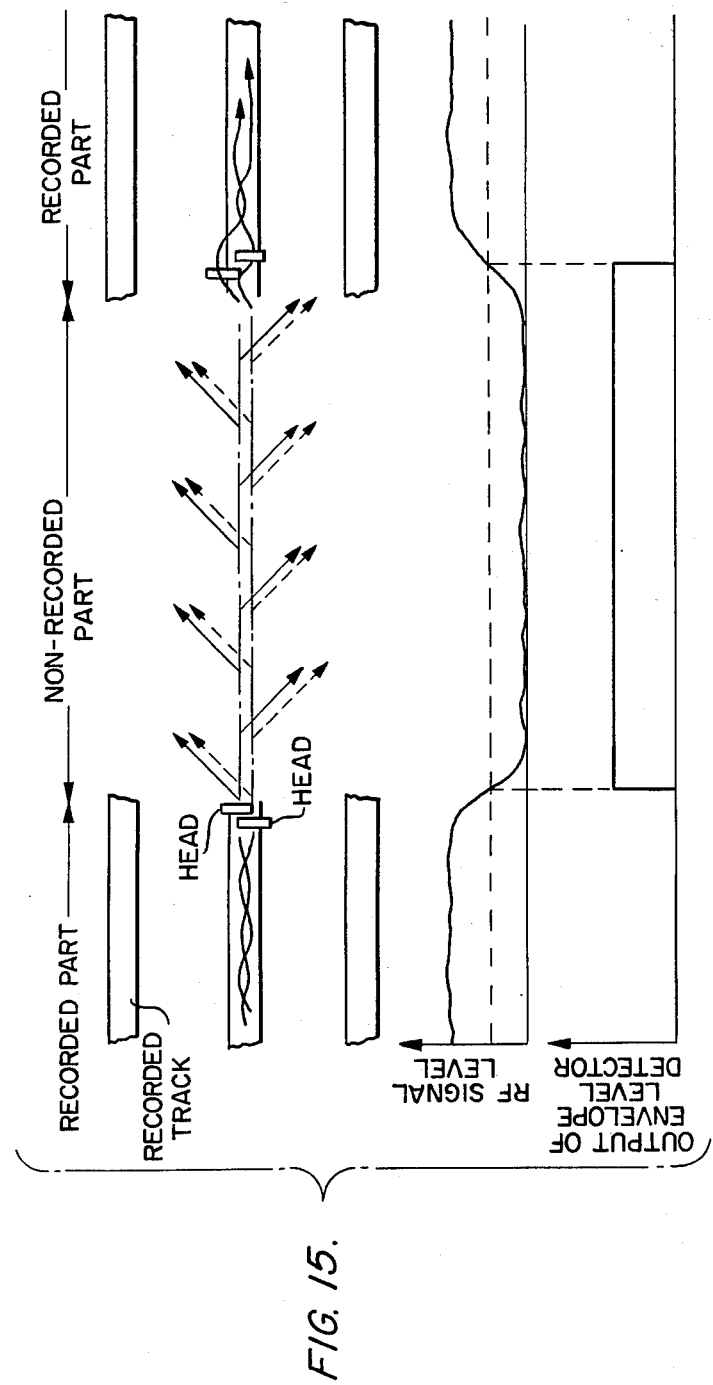
FIG. 15 shows a recorded part, non-recorded part and compulsory movement of heads in the non-recorded part.

FIG. 15 shows a recorded and non-recorded part on the magnetic tape and the compulsory movement of heads and the level of RF signal and the output signal of the envelope level detector. The compulsory movement means that the reproducing head moves in the direction of its axis of rotation from a predetermined position step by step and in the next moment the head moves in, the other direction of its axis of rotation from said predetermined position step by step. In this case, the distance of the heads' movement is aout ±1 track pitch as shown in FIG. 15, whereby two heads can track again on the same recorded track and they can track again the nearest track from a position in which the head could not reproduce any signal.

In this way, this system authomatically detects the tracking error between a reproducing head and a recorded track, and moves the reproducing head in the direction that attains better tracking position without causing jitter or color flicker of the picture on the TV.

Furthermore, many parts of the system of the invention are constructed by digital circuits, so that they are easily replaced by a microcomputer (especially the control circuit and timing pulse generator).

What is claimed is:

1. A tracking-error correcting system in a video reproducing apparatus, comprising:
    an envelope detecting means for detecting an envelope of a reproduced video signal;
    two sampling and holding means each for sampling and holding an output signal from said envelope detecting means at a predetermined timing in each frame;
    a timing pulse generating means for generating a sampling pulse which is supplied once to one of said two sampling and holding means at said predetermined timing in each frame and for generating clock signals, said sampling pulse being supplied alternatingly to said two sampling and holding means so that each of said two sampling and holding menas carries out its sampling operation at said predetermined timing in every two frames;
    a comparing means for comparing output signals from said two sampling and holding means;
    a control voltage generating means for generating a control voltage which varies step by step for controlling movement of a reproducing head; and
    a controlling means for controlling said control voltage generating means by signals from said comparing means and said timing pulse generating means, whereby said control voltage generating means changes said control voltage by one step in each frame for causing said reproducing head to move one step in a direction to increase the amplitude of said envelope when reproducing head is not in contact with a magnetic tape.

2. A system according to claim 9, further comprising:
    another envelope level detecting means for comparing said amplitude of said envelope with a predetermined threshold; and
    correcting means whose output signal is applied to said controlling means, whereby, when said envelope amplitude from said video reproducting apparatus is lower than said predetermined threshold, said another envelope level detecting means generates a signal by which said correcting means controls said controlling means so as to make said reproducing head move one step in a direction to increase said amplitude of said envelope.

3. A system according to claim 1, wherein said two sampling and holding means have two input channels, and said two input channels are supplied with the same signal, and said two channels are controlled by different signals from said timing pulse means.

4. A system according to claim 1, wherein said reproducing head comprises the support means of a magnetic head, and said support means includes a piezo-ceramic material.

5. A system according to claim 1, further comprising a triangular wave generating means for correcting a difference of slant between the trace of said reproducing head and a recorded track on said magnetic tape during abnormal reproduction, wherein a signal from said triangular wave generating means and said stepped control voltage are mixed and supplied to said reproducing head.

6. A system according to claim 2, wherein said reproducing head is controlled so as to move step by step in a direction of its axis of rotation from predetermined positions and at the next action, said head is controlled so as to move step by step in the opposite direction of said axis of rotation from said predetermined position.

7. A tracking-error correcting system in a video reproducing apparatus, comprising:

an envelope detecting means for detecting an envelope of a reproduced video signal;

two sampling and holding means each for sampling and holding an output signal from said envelope detector at a different timing;

a timing pulse generating means for generating a sampling pulse which is supplied to said two sampling and holding means and for generating clock signals;

a comparing means for comparing output signals from said two sampling and holding means;

a control voltage generating means for generating a control voltage for controlling movement of a reproducing head; and a controlling means for controlling said control voltage generating means by signals from said comparing means and said timing pulse generating means, whereby said system detects said envelope of said reproduced video signal by said envelope detecting means, samples and holds said output signal from said envelope detecting means by means of said sampling and holding detecting means at a predetermined timing in each field according to said sampling pulse, compares in turn said output signals from said two sampling and holding means by means of said comparing means, controls said control voltage generating means by means of said controlling means according to said output signals from said comparing means and said clock signals from said timing pulse generating means, and moves said reproducing head by means of said control voltage generating means in a direction so as to increase the amplitude of said envelope when said reproducing head is not in contact with a magnetic tape;

wherein said control voltage generating means comprises an up-down counter and a D/A converter.

8. A tracking-error correcting system in a video reproducting apparatus, comprising:

an envelope detecting means for detecting an envelope of a reproduced video signal;

two sampling and holding means each for sampling and holding an output signal from said envelope detector at a different timing;

a timing pulse generating means for generating a sampling pulse which is supplied to said two sampling and holding means and for generating clock signals;

a comparing means for comparing output signals from said two sampling and holding means;

a control voltage generating means for generating a control voltage for controlling movement of a reproducing head; and a controlling means for controlling said control voltage generating means by signals from said comparing means and said timing pulse generating means, whereby said system detects said envelope of said reproduced video signal by said envelope detecting means, samples and holds said output signal from said envelope detecting means by means of said sampling and holding detecting means at a predetermined timing in each field according to said sampling pulse, compares in turn said output signals from said two sampling and holding means by means of said comparing means, controls said control voltage generating means by means of said controlling means according to said output signals from said comparing means and said clock signals from said timing pulse generating means, and moves said reproducing head by means of said control voltage generating means in a direction so as to increase the amplitude of said envelope when said reproducing head is not in contact with a magnetic tape;

wherein said controlling means comprises an exclusive-OR gate and a JK-flip flop.

* * * * *